W. S. HILL.
Circular-Saw.

No. 214,389. Patented April 15, 1879.

Witnesses:
H. S. Talbot
W. R. Marble

Inventor:
Warren S. Hill,
By Sylvenus Walker
Atty.

UNITED STATES PATENT OFFICE.

WARREN S. HILL, OF BOSTON, MASSACHUSETTS, ASSIGNOR TO JOSEPH A. ROBBINS, OF SAME PLACE.

IMPROVEMENT IN CIRCULAR SAWS.

Specification forming part of Letters Patent No. 214,389, dated April 15, 1879; application filed December 5, 1878.

*To all whom it may concern:*

Be it known that I, WARREN S. HILL, of Boston, in the county of Suffolk and State of Massachusetts, have invented certain new and useful Improvements in Circular Saws, of which the following is a specification.

The object of my invention is to diminish the tendency of circular saws to become heated from the journal-bearings, arbor, and collars communicating heat to the saw-plate therefrom, as is frequently the case with saws as heretofore constructed; and it consists in forming grooves radiating from the center or eye of the saw, and extending toward the periphery, the diameter of the collars, or more than such diameter, so as to allow a current of air to pass between the collars and saw-plate when the same is secured in position and being run, or in actual use in sawing lumber, as is hereinafter more fully described and set forth.

Figure 1:
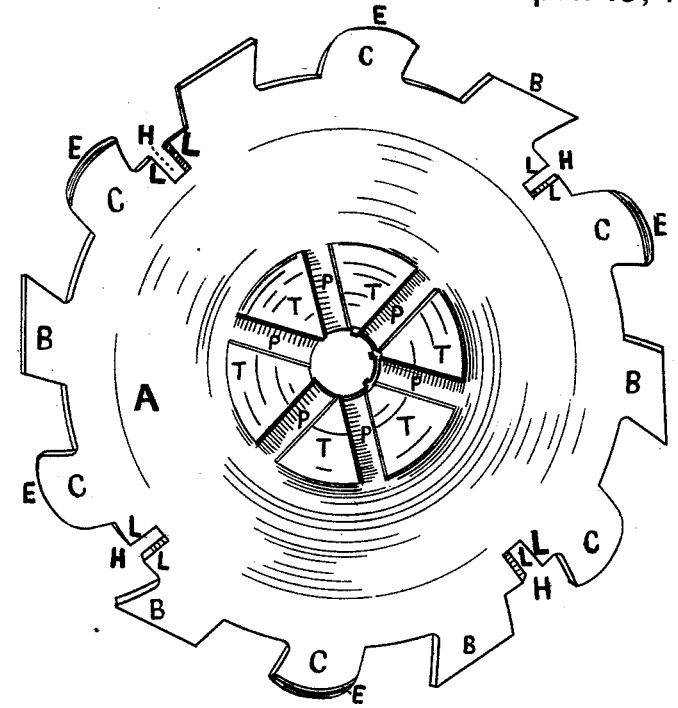
Figure 2:

Figure 1 is a perspective view of my invention. Fig. 2 is a vertical central section of the same.

A represents the saw-plate, being concaved from the teeth to the collar-line, and provided with clearing-teeth B, in the usual manner. C represents curved beveled cutting-teeth, which are beveled to the right and left alternately, and arranged alternately between the clearing-teeth B. The cutting-teeth C are provided with curved ends E, as fully shown in Fig. 1, forming an extended cutting-edge, which comes in contact with the lumber throughout its cutting-surface E, instead of a small round point, end, or corner, as heretofore. H represents oblique slots, extending into the plate A beyond the base of the teeth, and are beveled in such manner as to form chisel-shaped edges L, which are turned over or outward, so as to project beyond the faces or opposite sides of the saw-plate A, so as to serve as scrapers upon the surface of the lumber being sawed. P represents grooves radiating from the center or eye-hole of the saw-plate, and extending outward beyond the collar line or bearings T, which are of uniform thickness with the periphery of the saw-plate, so that when the saw is placed upon the arbor and clamped by means of the usual collars, which rest upon the triangular raised bearing portions T, and is securely held in contact therewith by the usual screw-threaded nut upon the arbor, as heretofore, air may enter between the collars and saw-plate by means of the corrugations or grooves, P, formed therein, and thus prevent the saw heating; and as such grooves serve to allow an equal expansion and contraction of the central portion of the saw with its outer portion or periphery, buckling or dishing is avoided, thus allowing the saw to be run at a higher rate of speed without wabbling or heating and binding when very hard lumber is being sawed.

Having thus described my invention, what I claim is—

In combination with a concaved circular saw, the grooves P, radiating from the center of the same, and leaving the raised or projecting portions T, so as to be clamped and held between the collars, as and for the purposes set forth.

WARREN S. HILL.

Witnesses:
SYLVENUS WALKER,
H. S. TALBOT.